(12) United States Patent
Fahmy

(10) Patent No.: US 8,510,386 B2
(45) Date of Patent: Aug. 13, 2013

(54) E-MAIL SERVICE PROVIDER METHOD AND APPARATUS

(76) Inventor: Joseph Fahmy, Santa Monica, CA (US)

( * ) Notice: Subject to any disclaimer, the term of this patent is extended or adjusted under 35 U.S.C. 154(b) by 855 days.

(21) Appl. No.: 10/935,907

(22) Filed: Sep. 8, 2004

(65) Prior Publication Data

US 2006/0053201 A1    Mar. 9, 2006

(51) Int. Cl.
*G06F 15/16* (2006.01)
*G06F 3/00* (2006.01)

(52) U.S. Cl.
USPC .......................................... 709/206; 715/752

(58) Field of Classification Search
None
See application file for complete search history.

(56) References Cited

U.S. PATENT DOCUMENTS

| | | | |
|---|---|---|---|
| 6,269,372 B1 * | 7/2001 | Wertheim | 707/10 |
| 6,594,502 B1 * | 7/2003 | Koester | 455/414.1 |
| 2002/0065828 A1 * | 5/2002 | Goodspeed | 707/100 |
| 2003/0016799 A1 * | 1/2003 | Stern et al. | 379/120 |
| 2005/0144024 A1 * | 6/2005 | Wojton et al. | 705/1 |
| 2007/0043812 A1 * | 2/2007 | Arfaa | 709/206 |

\* cited by examiner

*Primary Examiner* — Azizul Choudhury
(74) *Attorney, Agent, or Firm* — David A. Belasco; Belasco Jacobs & Townsley, LLP

(57) ABSTRACT

An e-mail service provider method and apparatus provide means for individuals to register with a service that provides e-mail addresses that correspond to their vehicle license plate characters. Registered users will make their e-mail addresses available to those observing their vehicles. The service provider also furnishes indicia for attachment to the vehicles that identify the vehicle owner as a registered user of the service and possibly having an interest in a particular sport, hobby, affiliation or other special interest. The service provider furnishes mailboxes for unregistered users, storing any mail for such users until the user registers with the service provider. Registered users are permitted to maintain profiles that store information related to the user such as hobbies, interests affiliations and, if desired, phone numbers. Registered users have the option of permitting access to their profiles by marketing interests. If access is granted, the user may receive targeted marketing e-mail.

12 Claims, 5 Drawing Sheets

E-MAIL SERVICE PROVIDER METHOD AND APPARATUS

FIELD OF INVENTION

The invention pertains to electronic mail or e-mail. More particularly, the invention relates to business and marketing techniques provided through an Internet Service Provider furnishing e-mail and related services.

BACKGROUND OF THE INVENTION

E-mail has been existence for at least 10 years now, providing a rapid, low-cost means of documented, non-interactive communications to businesses and individuals. It is particularly useful in that it provides a record of date and time of transmission and receipt as well as the contents of any message. E-mail is also useful in that it can be sent to multiple recipients at once and does not require an immediate, interactive reply. Thus e-mail can be very useful in a marketing context for presenting graphical and even video presentations to large numbers of individuals at once, for a later, considered response.

A present weakness in e-mail systems at present is that there are few comprehensive directories of e-mail addresses. While e-mail addresses are generally included in advertisements for business concerns, e-mail addresses for individuals are not commonly available unless volunteered by the individuals. As we are increasingly a society tied to our automobiles, the present invention provides a means to identify e-mail addresses related to vehicle license plates.

It is an objective of the present invention to provide a means to provide a means to send an e-mail to a recipient based upon the license plate number of the recipient's vehicle. It is a further objective to an online location at which individuals desiring to have an e-mail address corresponding to their license plate number can register for such an address. It is a still further objective of the invention to online mailboxes in which the owner's of e-mail addresses associated with their vehicle license plates may receive e-mail directed to them. It is yet a further objective to provide identifying stickers or decals for vehicles identifying a driver as an individual whose license plate corresponds to his or her e-mail address.

While some of the objectives of the present invention are disclosed in the prior art, none of the inventions found include all of the requirements identified.

SUMMARY OF THE INVENTION

The present invention addresses all of the deficiencies e-mail system and method inventions and satisfies all of the objectives described above.

(1) An e-mail service provider method having the desired features may be provided by performing the following steps. Providing at least one server. The server is connected to a public wide area network and hosts a web site accessible over the network. Providing software on the server allowing users to register for and use e-mail addresses hosted on the server at the website. Creating e-mail addresses based upon vehicle license plate characters. Providing mailboxes accessible by registered users at the website allowing the registered user to receive and send e-mail using the e-mail address based upon vehicle license plate characters.

(2) A variant of the invention includes the further step of providing at least one mailbox for an unregistered user. The mailbox holds e-mail addressed to the unregistered user and becomes accessible to the unregistered user upon registration.

(3) A further variant includes the additional step of providing identifying indicia for attachment to a user's vehicle. The indicia identifies the vehicle as belonging to a registered user of the web site.

(4) A still a further variant includes the additional step of providing on the indicia identification of the registered user as having an interest in any of a particular sport, hobby, past time and special interest.

(5) Another variant of the invention has the further steps of providing incentives for an individual to become a representative of the service provider and to solicit new registered users of the web site. Providing further incentives for an individual to recruit and manage additional representatives of the service provider.

(6) Still another variant has the further step of providing means for registered users to identify any of particular sports, hobbies, past times and special interests in a profile associated with their e-mail address.

(7) Yet another variant has the further steps of providing registered users with a means for controlling access to their profiles for any of individuals, businesses and other entities. Providing means for any of the individuals, businesses and other entities having access granted to the profiles to e-mail the registered users. When the access is granted to any of the individuals, businesses and other entities, the granting registered users will receive e-mails targeted to their particular sports, hobbies, past times and special interests.

(8) Still another variant, has the further step of providing a phone number in said profile. When the profile is accessed by a registered user, the phone number will be available to the registered user.

(9) In another variant of the invention, an e-mail system, has at least one server. The server is connected to a public wide area network and hosts a web site accessible over the network. Software is provided on the server allowing users to register for and use e-mail addresses hosted on the server at the web site. E-mail addresses based upon vehicle license plate characters are provided. Mailboxes accessible by registered users at the web site are provided, allowing the registered user to receive and send e-mail using the e-mail address based upon vehicle license plate characters.

(10) In still another variant, at least one mailbox for an unregistered user is provided. The mailbox holds e-mail addressed to the unregistered user. The mail box becomes accessible to the unregistered user upon registration.

(11) In yet another variant, identifying indicia is provided for attachment to a user's vehicle, the indicia identifying the vehicle as belonging to a registered user of the web site.

(12) In a further variant of the invention, the indicia further includes identification of the registered user as having an interest in any of a particular sport, hobby, past time and special interest.

(13) In still a further variant, means are provided for registered users to identify any of particular sports, hobbies, past times and special interests in a profile associated with their e-mail address.

(14) In yet a further variant, means are provided for registered users to control access to their profiles for any of individuals, businesses and other entities. Means are provided for any of the individuals, businesses and other entities having access granted to the profiles to e-mail the registered users. When the access is granted to any of the individuals, businesses and other entities, the granting registered users will receive e-mails targeted to their particular sports, hobbies, past times and special interests.

(15) In a final variant of the invention, a phone number is provided in the profile. When the profile is accessed by a registered user, the phone number will be available to the registered user.

An appreciation of the other aims and objectives of the present invention and an understanding of it may be achieved by referring to the accompanying drawings and the detailed description of a preferred embodiment.

DESCRIPTION OF THE DRAWINGS

DETAILED DESCRIPTION OF THE PREFERRED EMBODIMENT (1) FIGS. 1-11 illustrate an e-mail service provider method 10 having the desired features that may be provided by performing the following steps. Providing at least one server 15. The server 15 is connected to a public wide area network 20 and hosts a web site 25 accessible over the network 20. Providing software 30 on the server 15 allowing users 35 to register for and use e-mail addresses 40 hosted on the server 15 at the web site 25. Creating e-mail addresses 40 based upon vehicle license plate characters 45. Providing mailboxes 50 accessible by registered users 35 at the website 25 allowing the registered user 35 to receive and send e-mail 55 using the e-mail address 40 based upon vehicle license plate characters 45.

Figure 1:
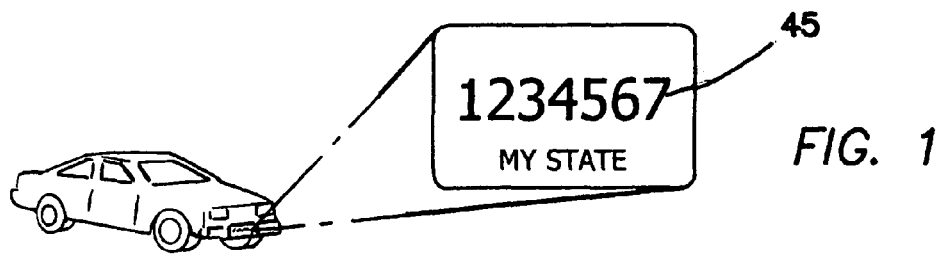
FIG. 1 is a perspective view of a car with an enlargement showing a license plate number.
Figure 2:
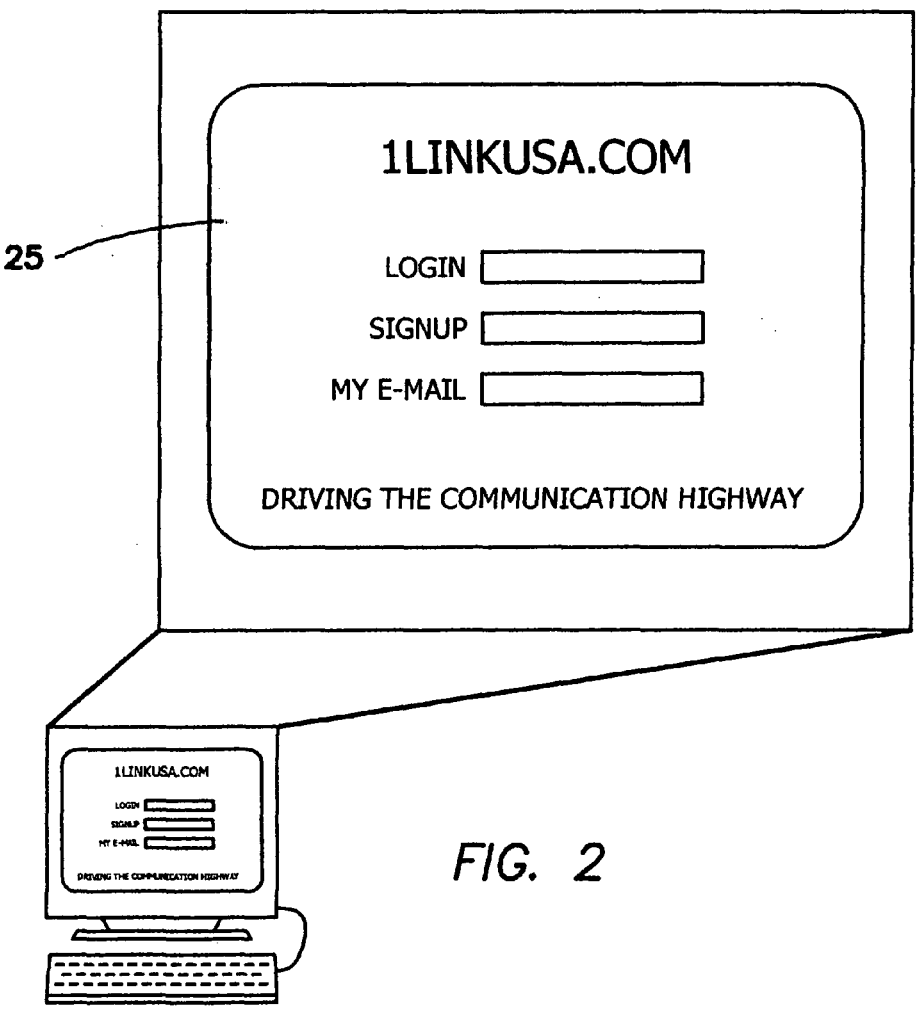
FIG. 2 is a schematic representation of a computer showing a sign-in screen for the e-mail system.
Figure 3:
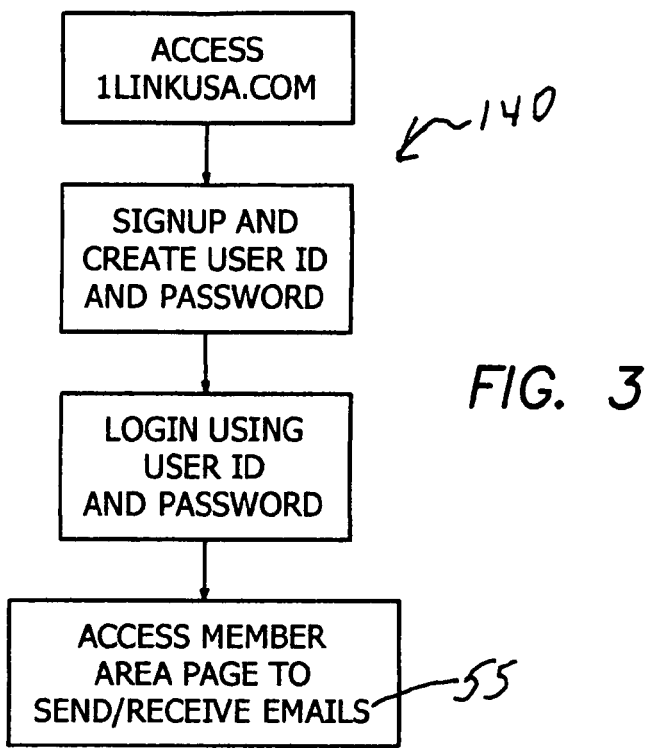
FIG. 3 is a schematic representation of the steps for accessing the e-mail system.
Figure 4:
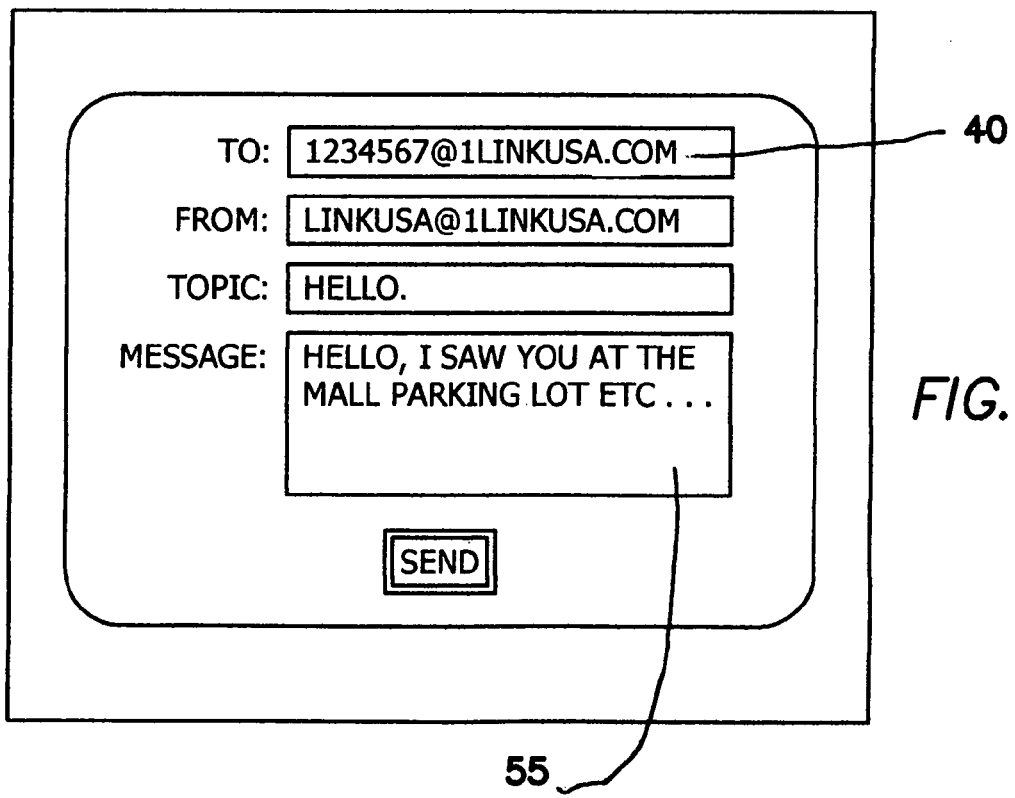
FIG. 4 is a schematic representation of an e-mail sending screen.
Figure 5:
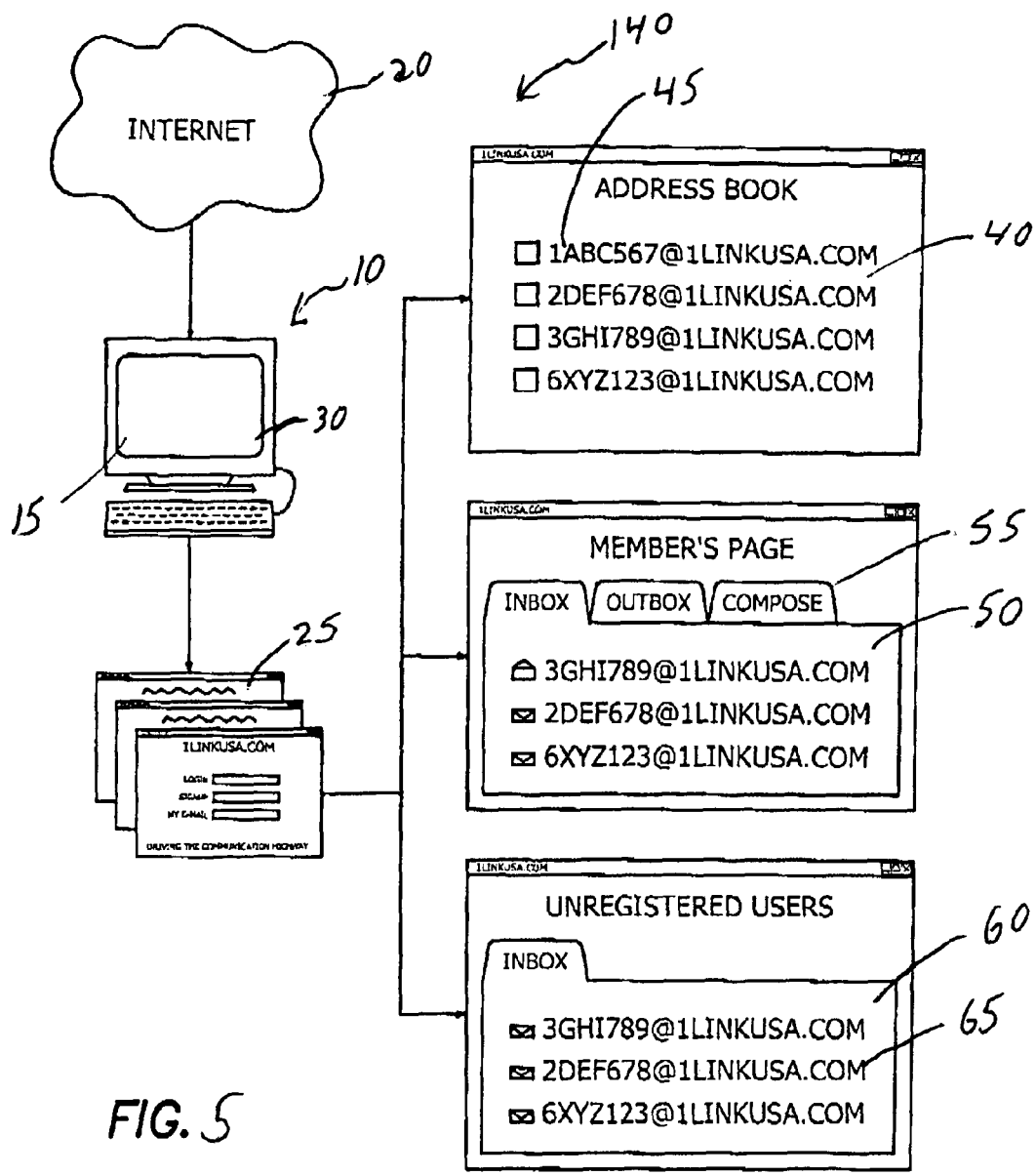
FIG. 5 is a schematic representation of a server connected to the Internet and screens displaying e-mail addresses, member mailboxes and unregistered user mailboxes.
Figure 6:
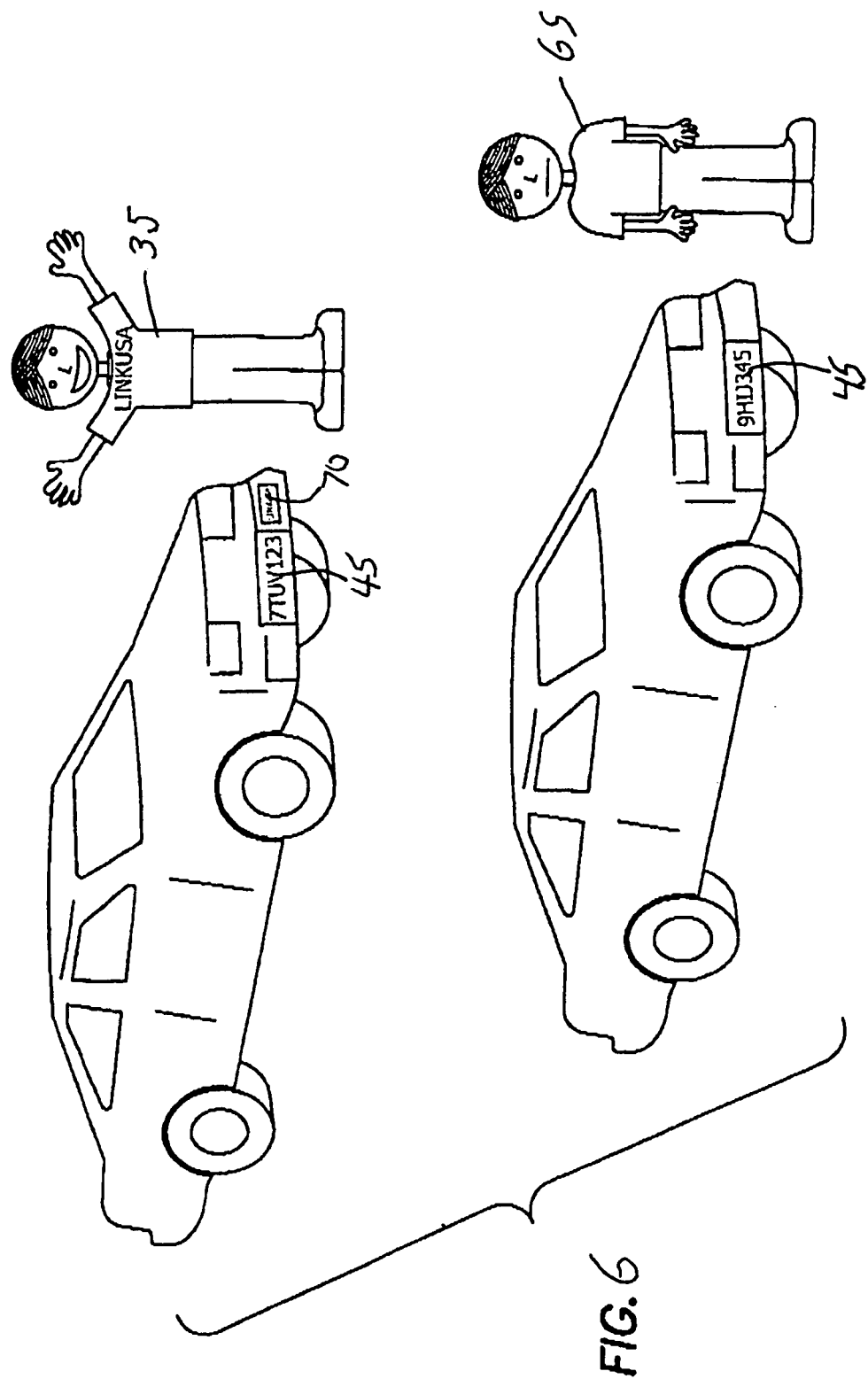
FIG. 6 is a drawing of a member and an unregistered user, each with their cars, the members car illustrating identifying indicia.
Figure 7:
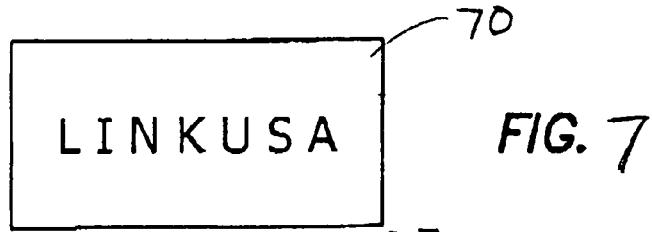
FIG. 7 is an illustration of a member's identifying indicia sticker.
Figure 8:
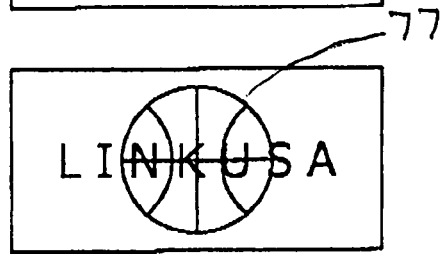
FIG. 8 is an illustration of a member's identifying indicia sticker for baseball fans.
Figure 9:
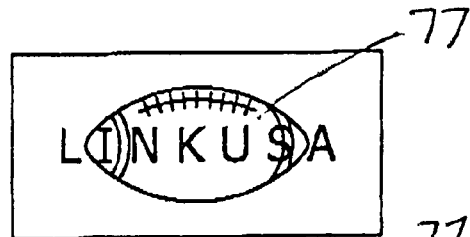
FIG. 9 is an illustration of a member's identifying indicia sticker for football fans.
Figure 10:
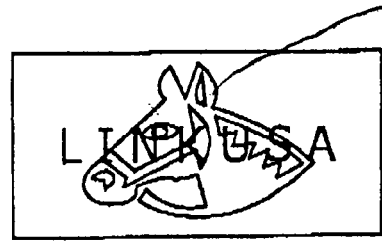
FIG. 10 is an illustration of a member's identifying indicia sticker for horse racing fans.
Figure 11:
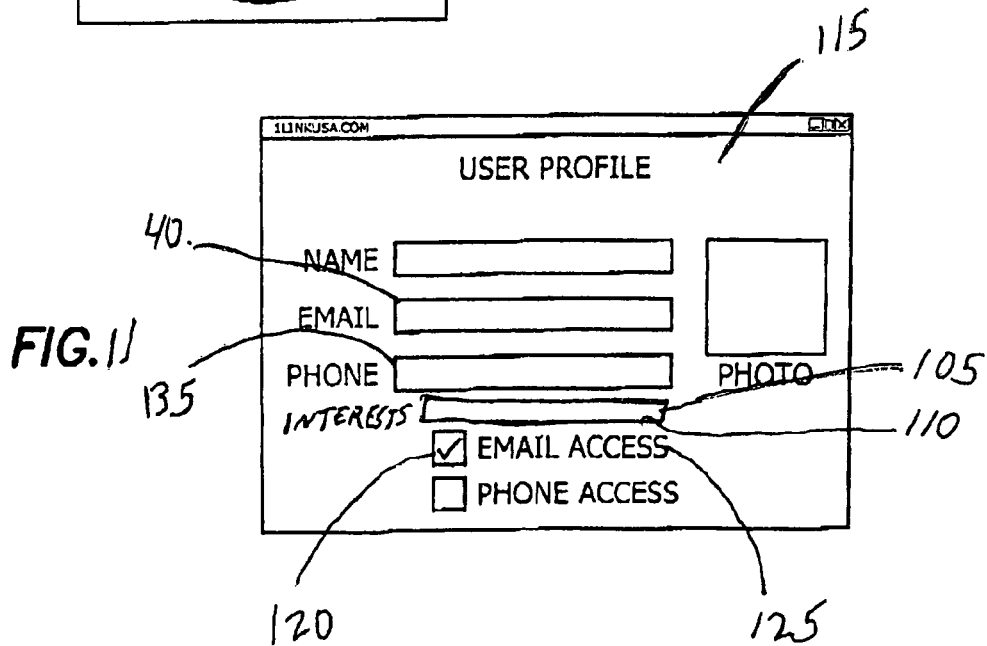
FIG. 11 is a schematic representation of a user profile.

(2) A variant of the invention includes the further step of providing at least one mailbox 60 for an unregistered user 65. The mailbox 60 holds e-mail 55 addressed to the unregistered user 65 and becomes accessible to the unregistered user 65 upon registration.

(3) A further variant includes the additional step of providing identifying indicia 70 for attachment to a user's vehicle 75. The indicia 70 identifies the vehicle 75 as belonging to a registered user 35 of the web site 25.

(4) A still a further variant includes the additional step of providing on the indicia 70 identification 77 of the registered user 35 as having an interest in any of a particular sport, hobby, past time and special interest.

(5) Another variant of the invention has the further steps of providing incentives for an individual to become a representative of the service provider and to solicit new registered users 35 of the web site 25. Providing further incentives for an individual to recruit and manage additional representatives of the service provider.

(6) Still another variant has the further step of providing means 100 for registered users 35 to identify any of particular sports 105, hobbies 110, past times (not shown) and special interests (not shown) in a profile 115 associated with their e-mail address 40.

(7) Yet another variant has the further steps of providing registered users 35 with a means 120 for controlling access 125 to their profiles 115 for any of individuals, businesses and other entities. Providing means 130 for any of the individuals, businesses and other entities having access 125 granted to the profiles 115 to e-mail the registered users 35. When the access 125 is granted to any of the individuals, businesses and other entities, the granting registered users 35 will receive e-mails 55 targeted to their particular sports, hobbies, past times and special interests.

(8) Still another variant, has the further step of providing a phone number 135 in said profile 115. When the profile 115 is accessed by a registered user 35, the phone number 135 will be available to the registered user 35.

(9) In another variant of the invention, an e-mail system 140, has at least one server 15. The server 15 is connected to a public wide area network 20 and hosts a web site 25 accessible over the network 20. Software 30 is provided on the server 15 allowing users 35 to register for and use e-mail addresses 40 hosted on the server 15 at the web site 25. E-mail addresses 40 based upon vehicle license plate characters 45 are provided. Mailboxes 50 accessible by registered users 35 at the web site 25 are provided, allowing the registered user 35 to receive and send e-mail 55 using the e-mail address 40 based upon vehicle license plate characters 45.

(10) In still another variant, at least one mailbox 60 is provided for an unregistered user 65. The mailbox 60 holds e-mail 55 addressed to the unregistered user 65. The mail box 60 becomes accessible to the unregistered user 65 upon registration.

(11) In yet another variant, identifying indicia 70 is provided for attachment to a user's vehicle 75, the indicia 70 identifying the vehicle 75 as belonging to a registered user 35 of the web site 25.

(12) In a further variant of the invention, the indicia 70 further includes identification 77 of the registered user 35 as having an interest in any of a particular sport, hobby, past time and special interest.

(13) In still a further variant, means 100 are provided for registered users 35 to identify any of particular sports 105, hobbies 110, past times and special interests in a profile associated with their e-mail address 40.

(14) In yet a further variant, means 120 are provided for registered users 35 to control access 125 to their profiles 115 for any of individuals, businesses and other entities. Means 130 are provided for any of the individuals, businesses and other entities having access 125 granted to the profiles 115 to e-mail the registered users 35. When the access 125 is granted to any of the individuals, businesses and other entities, the granting registered users 35 will receive e-mails 55 targeted to their particular sports 105, hobbies 110, past times and special interests.

(15) In a final variant of the invention, a phone number 135 is provided in the profile 115. When the profile 115 is accessed by a registered user 35, the phone number 135 will be available to the registered user 35.

The e-mail service provider method 10 and e-mail system 140 have been described with reference to particular embodiments. Other modifications and enhancements can be made without departing from the spirit and scope of the claims that follow.

The invention claimed is:

1. An e-mail service provider method, comprising the steps of:
   providing at least one server, said server being connected to a public wide area network and hosting a web site accessible over said network;
   providing software on said server allowing users to register for and use e-mail addresses hosted on said server at said website;
   creating at least one e-mail address incorporating vehicle license plate characters of a registered user as a user name of said e-mail address;
   providing mailboxes accessible by registered users at the website allowing said registered user to receive and send e-mail using said e-mail address incorporating said vehicle license plate characters;
   providing identifying indicia for attachment to a user's vehicle, said indicia identifying the vehicle as belonging to a registered user of said web site; and
   providing on said indicia identification of said registered user as having an interest in any of a particular sport, hobby, past time and special interest.

2. An e-mail service provider method, as described in claim 1, further comprising the step of providing at least one mailbox for an unregistered user, said mailbox incorporating vehicle license plate characters of said unregistered user as a user name of said e-mail address, holding e-mail addressed to said unregistered user and becoming accessible to said unregistered user upon registration.

3. An e-mail service provider method, as described in claim 1, further comprising the steps of:
   providing incentives for an individual to become a representative of said service provider and to solicit new registered users of said web site; and
   providing further incentives for an individual to recruit and manage additional representatives of said service provider.

4. An e-mail service provider method, as described in claim 1, further comprising the step of allowing registered users to identify any of particular sports, hobbies, past times and special interests in a profile associated with their e-mail address.

5. An e-mail service provider method, as described in claim 4, further comprising the steps of:
   allowing registered users to control access to their profiles for any of individuals, businesses and other entities;
   allowing any of said individuals, businesses and other entities having access granted to said profiles to e-mail said registered users; and
   whereby, when said access is granted to any of said individuals, businesses and other entities, said granting registered users will receive e-mails targeted to their particular sports, hobbies, past times and special interests.

6. An e-mail service provider method, as described in claim 4, further comprising the steps of:
   providing a phone number in said profile; and
   whereby, when said profile is accessed by a registered user, said phone number will be available to said registered user.

7. An e-mail system, comprising:
   at least one server, said server being connected to a public wide area network and hosting a web site accessible over said network by a computer;
   software on said server allowing users to register for and use e-mail addresses hosted on said server at said website;
   e-mail addresses incorporating vehicle license plate characters of a registered user as a user name of said e-mail address;
   mailboxes accessible by registered users at said website allowing said registered user to receive and send e-mail using said e-mail address incorporating said vehicle license plate characters; and
   identifying indicia for attachment to a user's vehicle, said indicia identifying the vehicle as belonging to a registered user of said web site.

8. An e-mail system, as described in claim 7, further comprising at least one mailbox for an unregistered user, said mailbox incorporating vehicle license plate characters of said unregistered user as a user name of said e-mail address, holding e-mail addressed to said unregistered user and becoming accessible to said unregistered user upon registration.

9. An e-mail system, as described in claim 7, wherein said indicia further comprises identification of said registered user as having an interest in any of a particular sport, hobby, past time and special interest.

10. An e-mail system, as described in claim 7, further comprising means for registered users to identify any of particular sports, hobbies, past times and special interests in a profile associated with their e-mail address.

11. An e-mail system, as described in claim 10, further comprising:
    access control to registered users to their profiles for any of individuals, businesses and other entities; and
    wherein said access is granted to any of said individuals, businesses and other entities, said granting registered users will receive e-mails targeted to their particular sports, hobbies, past times and special interests.

12. An e-mail system, as described in claim 10, further comprising:
    a phone number in said profile; and
    whereby, when said profile is accessed by a registered user, said phone number will be available to said registered user.

* * * * *